US011642936B2

United States Patent
Scalf et al.

(10) Patent No.: US 11,642,936 B2
(45) Date of Patent: May 9, 2023

(54) RECREATIONAL VEHICLE AIR CONDITIONING SYSTEM WITH LOAD SHARING

(71) Applicant: Midea Group Co., Ltd., Foshan (CN)

(72) Inventors: Eric Scalf, Louisville, KY (US); David Leezer, LaGrange, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 17/490,899

(22) Filed: Sep. 30, 2021

(65) Prior Publication Data
US 2023/0098535 A1    Mar. 30, 2023

(51) Int. Cl.
*B60H 1/00* (2006.01)
*F25B 49/02* (2006.01)

(52) U.S. Cl.
CPC ....... *B60H 1/00364* (2013.01); *B60H 1/0073* (2019.05); *B60H 1/00885* (2013.01); *F25B 49/025* (2013.01); *B60H 1/00742* (2013.01); *B60H 1/00785* (2013.01); *B60H 1/00792* (2013.01); *B60H 2001/00942* (2013.01); *F25B 2600/021* (2013.01)

(58) Field of Classification Search
CPC ............. B60H 1/00364; B60H 1/0073; B60H 1/00885; B60H 1/00742; B60H 1/00785; B60H 1/00792; B60H 2001/00942; F25B 49/025; F25B 2600/021
See application file for complete search history.

(56) References Cited

U.S. PATENT DOCUMENTS 3,556,203 A    1/1971 Kyle
3,719,058 A    3/1973 Waygood
(Continued)

FOREIGN PATENT DOCUMENTS

EP    3628516 A1    4/2020
EP    3628517 A1 *  4/2020

OTHER PUBLICATIONS

Richz, et al. "2 AC Units—Program Thermostat to run both at same time?" RVLifePro-Air Forums, Retrieved from: https://www.airforums.com/forums/f427/2-ac-units-program-thermostat-to-run-both-at-same-time-192426.html, Feb. 20, 2019.

*Primary Examiner* — Nelson J Nieves
(74) *Attorney, Agent, or Firm* — Gray Ice Higdon

(57) ABSTRACT

A recreational vehicle air conditioning system supports multiple recreational vehicle air conditioning units having closed air conditioning circuits and a controller that is electronically coupled to each of the recreational vehicle air conditioning units to control each of the closed air conditioning circuits to regulate an overall power consumption of the multiple recreational vehicle air conditioning units. A recreational vehicle air conditioning system may also support multiple recreational vehicle air conditioning units where a refrigerant line set is coupled between the recreational vehicle air conditioning units such that a compressor in one of the recreational vehicle air conditioning units is capable of supplying refrigerant to the evaporators of the multiple recreational vehicle air conditioning units, and such that valves coupled in series with each of the evaporators may be regulated to control cooling by each recreational vehicle air conditioning unit.

20 Claims, 6 Drawing Sheets

(56) References Cited

U.S. PATENT DOCUMENTS

| | | | |
|---|---|---|---|
| 3,885,398 A * | 5/1975 | Dawkins | F25B 5/02 |
| | | | 62/236 |
| 3,984,224 A * | 10/1976 | Dawkins | B60H 1/3204 |
| | | | 62/236 |
| 4,784,214 A | 11/1988 | Penson et al. | |
| 5,046,327 A | 9/1991 | Walker et al. | |
| 6,708,513 B2 * | 3/2004 | Koehler | F25B 9/008 |
| | | | 62/324.1 |
| 6,965,818 B2 | 11/2005 | Koenig et al. | |
| 7,849,698 B2 | 12/2010 | Harrod et al. | |
| 2004/0221598 A1 * | 11/2004 | Hille | B60H 1/00542 |
| | | | 62/244 |
| 2005/0141154 A1 | 6/2005 | Consadori et al. | |
| 2018/0147913 A1 * | 5/2018 | Bergin | B60H 1/00657 |
| 2019/0126949 A1 * | 5/2019 | Tashiro | B60H 1/3225 |
| 2021/0207882 A1 * | 7/2021 | Jurek | B60H 1/00985 |
| 2021/0276396 A1 * | 9/2021 | Jurek | F24F 13/078 |
| 2022/0169089 A1 * | 6/2022 | Henderson | B60L 1/00 |

\* cited by examiner

RECREATIONAL VEHICLE AIR CONDITIONING SYSTEM WITH LOAD SHARING

BACKGROUND

Recreational vehicles (RVs) such as motorhomes, travel trailers, fifth wheel trailers, etc. often utilize rooftop air conditioning (AC) units for cooling, and in some instances, also for heating, dehumidification and/or ventilation. Larger RVs such as Class A motorhomes, often use two or three rooftop AC units to handle different regions or zones of the living space. Rooftop AC units, however, are among the highest power consuming devices in an RV, and while some larger RVs are capable of utilizing 50 Amp services with sufficient capacity to concurrently operate multiple rooftop AC units, some RVs only support 30 Amp services where concurrent operation of multiple rooftop AC units is likely to exceed the allowable current in some circumstances, which can cause a circuit breaker to be tripped and for all power to be cut to the RV. In many instances, smaller RVs supporting only 30 Amp service may only offer a secondary rooftop AC unit as an optional upgrade, which if not purchased may result in insufficient cooling/heating capacity in the living space and/or an inability to separately control different zones of the living space. Further, even where an RV supports 50 Amp service, some campgrounds or campsites may only provide 30 Amp service, subjecting these larger RVs to a potential for tripped circuit breakers.

A tripped circuit breaker can be frustrating for an RV owner, as all power to the RV may be shut off, or at least all power to the devices on the circuit with the tripped circuit breaker. Further, the owner is generally required to manually reset the circuit breaker, and potentially may have to leave the living space of the RV in order to access the breaker box. As a result, some attempts have been made to address the issues caused by the use of multiple rooftop AC units, including using a third party power center that is often integrated into a main power board of the RV and that is capable of routing power from various sources, e.g., shore power, on-board batteries, the RV alternator, a generator, solar panels, etc., to different circuits. Some power centers, in particular, support load shedding, where if an overloaded condition is detected, power to one or more loads, e.g., an AC unit, is shut off to avoid a tripped circuit breaker. While a tripped circuit breaker is avoided, however, the result of load shedding is that devices are often shut completely off, at least temporarily, and in the case of an AC unit, the AC unit temporarily stops cooling or heating the living space.

Therefore, a need continues to exist in the art for a manner of supporting multiple AC units in a recreational vehicle to support additional capacity and/or multiple zones in the living space, and to do so in a manner that accommodates power limitations of the RV and/or a power source powering the same.

SUMMARY

The herein-described embodiments address these and other problems associated with the art by utilizing in one aspect a recreational vehicle air conditioning system that supports multiple recreational vehicle air conditioning units having closed air conditioning circuits and a controller that is electronically coupled to each of the recreational vehicle air conditioning units to control each of the closed air conditioning circuits to regulate an overall power consumption of the multiple recreational vehicle air conditioning units. In another aspect, a recreational vehicle air conditioning system may support multiple recreational vehicle air conditioning units where a refrigerant line set is coupled between the recreational vehicle air conditioning units such that a compressor in one of the recreational vehicle air conditioning units is capable of supplying refrigerant to the evaporators of the multiple recreational vehicle air conditioning units, and such that valves coupled in series with each of the evaporators may be regulated to control cooling by each recreational vehicle air conditioning unit.

Therefore, consistent with one aspect of the invention, an air conditioning system for a recreational vehicle may include a first recreational vehicle air conditioning unit, the first recreational vehicle air conditioning unit including a first closed air conditioning circuit including a first compressor for cooling a first zone in a living space of the recreational vehicle, a second recreational vehicle air conditioning unit, the second recreational vehicle air conditioning unit including a second closed air conditioning circuit including a second compressor for cooling a second zone in the living space of the recreational vehicle, and a controller in electrical communication with each of the first and second closed air conditioning circuits and configured to control operation of each of the first and second air conditioning circuits to regulate an overall power consumption for the first and second closed air conditioning circuits.

In some embodiments, the controller is external to both of the first and second recreational vehicle air conditioning units. Also, in some embodiments, the controller is disposed in the first recreational vehicle air conditioning unit. Further, in some embodiments, the controller is a first controller and the second recreational vehicle air conditioning unit includes a second controller disposed in the second recreational vehicle air conditioning unit and in communication with the first controller.

Some embodiments may further include a communication channel established between the first and second controllers, and the first controller is configured to control operation of the second air conditioning circuit by instructing the second controller over the communication channel. In some embodiments, the communication channel includes a wired low power communication link extending between the first and second recreational vehicle air conditioning units. In addition, in some embodiments, the first controller is configured to operate in a shared mode in response to detection of the second recreational vehicle air conditioning unit over the communication channel, and to otherwise operate in a stand alone mode.

Some embodiments may also include first and second sensors disposed in each of the first and second zones, and the controller is configured to receive measurements from the first and second sensors and to control operation of each of the first and second air conditioning circuits based at least in part on the measurements from the first and second sensors. In some embodiments, each of the first and second sensors is a temperature sensor, an occupancy sensor, a current sensor, or a humidity sensor.

In addition, in some embodiments, the first air conditioning circuit further includes an inverter configured to regulate a speed of the first compressor, and the controller is configured to control operation of each of the first and second air conditioning circuits at least in part by controlling the inverter to regulate the speed of the first compressor. Moreover, in some embodiments, the first air conditioning circuit further includes a first fan for blowing cooled air into the first zone and the second air conditioning circuit further includes a second fan for blowing cooled air into the second zone, and the controller is further configured to control operation of each of the first and second air conditioning circuits at least in part by controlling the first and second fans.

Consistent with another aspect of the invention, a recreational vehicle air conditioning unit may include a closed air conditioning circuit including a compressor for cooling a living space of a recreational vehicle, a communication port configured to communicate with another air conditioning unit that is external thereto, and a controller configured to selectively operate in one of a stand alone mode and a shared mode. When in the stand alone mode, the controller is configured to control operation of the air conditioning circuit to cool the living space of the recreational vehicle, and when in the shared mode, the controller is configured to additionally instruct the other air conditioning unit over the communication port to control operation of the other air conditioning unit to cool a different zone of the recreational vehicle.

In some embodiments, the closed air conditioning circuit is a first closed air conditioning circuit and the compressor is a first compressor, the other air conditioning unit includes a second closed air conditioning circuit including a second compressor, and when in the shared mode, and the controller is configured to control operation of each of the first and second air conditioning circuits to regulate an overall power consumption for the first and second closed air conditioning circuits. Moreover, in some embodiments, the controller is configured to select the shared mode in response to detecting the other air conditioning unit over the communication port. In some embodiments, the shared mode is a primary shared mode, and the controller is further configured to selectively operate in a secondary shared mode, and when in the secondary shared mode, control operation of the closed air conditioning circuit in response to an instruction received over the communication port.

Consistent with another aspect of the invention, an air conditioning system for a recreational vehicle may include a first recreational vehicle air conditioning unit for cooling a first zone in a living space of the recreational vehicle, the first recreational vehicle air conditioning unit including a first air conditioning circuit including a compressor, a first evaporator, and a first valve configured to regulate refrigerant flow through the first evaporator, a first refrigerant port coupled in parallel with the first evaporator, the first refrigerant port including a first outlet coupled upstream of the first evaporator and a first inlet coupled downstream of the first evaporator, and a second valve configured to regulate refrigerant flow through the refrigerant port; a second recreational vehicle air conditioning unit for cooling a second zone in the living space of the recreational vehicle, the second recreational vehicle air conditioning unit including a second air conditioning circuit including a second evaporator, and a second refrigerant port including a second inlet coupled upstream of the second evaporator and a second outlet coupled downstream of the second evaporator; a refrigerant line set coupling the first outlet to the second inlet and coupling the second outlet to the first inlet to place the second evaporator in fluid communication with the compressor; and a controller coupled to the compressor and the first and second valves and configured to control the first and second valves while running the compressor to regulate refrigerant flow through each of the first and second evaporators and thereby control cooling of the first and second zones in the living space of the recreational vehicle.

In some embodiments, the second recreational vehicle air conditioning unit is configured to be mounted on a side wall of the recreational vehicle. In addition, in some embodiments, the second recreational vehicle air conditioning unit is configured to be mounted in a cabinet of the recreational vehicle. Moreover, in some embodiments, the first recreational vehicle air conditioning unit is configured to mounted on a rear of the recreational vehicle. Also, in some embodiments, the first air conditioning circuit further includes a condenser coupled downstream of the compressor and upstream of the first evaporator, the first valve is coupled between the condenser and the first evaporator, the second valve is coupled between the condenser and the first outlet, the first recreational vehicle air conditioning unit further includes a third valve coupled between the first evaporator and the compressor and a fourth valve coupled between the first inlet and the compressor, and the controller is further coupled to the third and fourth valves to regulate refrigerant flow through each of the first and second evaporators.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
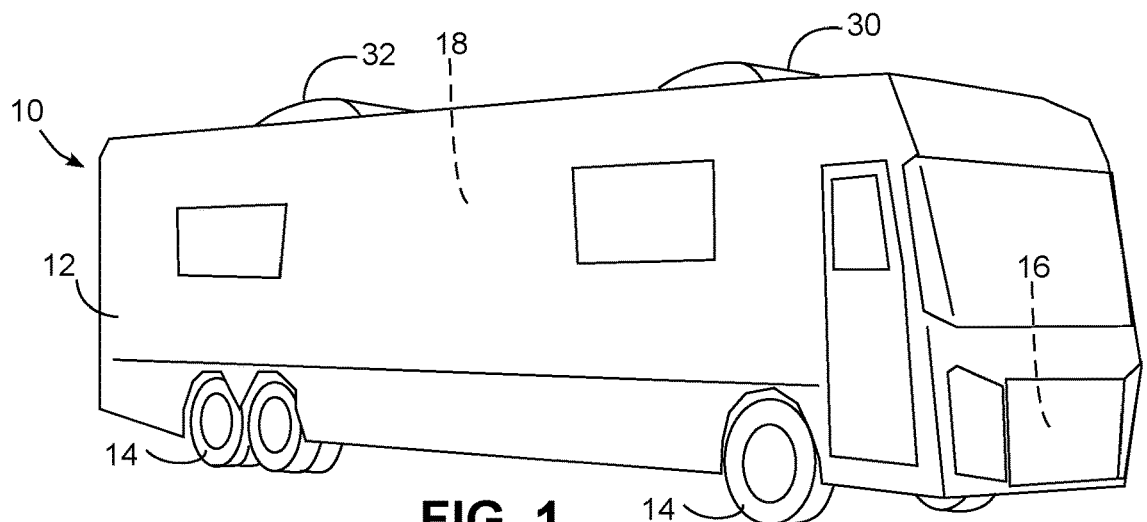
FIG. 1 is a perspective view of a recreational vehicle consistent with some embodiments of the invention.
Figure 2:
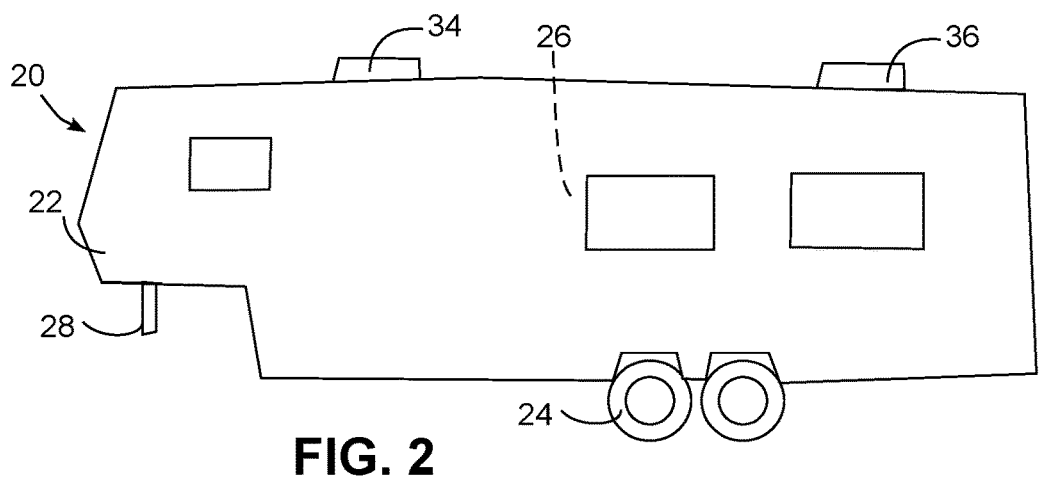
FIG. 2 is a side elevational view of another recreational vehicle consistent with some embodiments of the invention.

In embodiments consistent with the invention, a recreational vehicle air conditioning system is used to operate multiple recreational vehicle air conditioning units in multiple zones of a living space of a recreational vehicle. In this regard, a recreational vehicle may be considered to be a wheeled vehicle capable of being moved from place to place (either under its own power or under the power of a towing vehicle) and containing a living space that is capable of being climate controlled using one or more air conditioning units. The living space generally includes, at a minimum, a sleeping space, kitchen facilities, eating space, and in some instances, bathroom facilities, and is intended to be used as a dwelling by users at least when the vehicle is parked or stationary. FIG. 1, for example, illustrates one type of recreational vehicle, a motorhome or motor coach 10, which includes a main body 12, wheels 14, a powertrain (e.g., an engine) 16, and an interior living space 18. FIG. 2 illustrates another type of recreational vehicle, a travel trailer, or in this case, a fifth wheel trailer 20, which, similar to motorhome 10, includes a main body 22, wheels 24 and interior living space 26, but instead of having its own powertrain that allows for independent movement, includes a hitch 28 for coupling to a separate vehicle such as a pickup truck capable of moving the fifth wheel trailer 20 from place to place. It will be appreciated that a recreational vehicle may take other forms in other embodiments, so a recreational vehicle is not limited to the specific motorhome and fifth wheel trailer implementations illustrated herein.

A recreational vehicle air conditioning unit in turn may be considered to be a self-contained device incorporated into one or more housings and providing an air conditioning function, and in some instances, one or more additional climate control-related functions such as heat (e.g., via a heat pump or heating element), dehumidification, ventilation, etc. FIG. 1, for example, illustrates a pair of rooftop recreational vehicle air conditioning units 30, 32 disposed on a roof of motorhome 10, while FIG. 2 illustrates a pair of rooftop recreational vehicle air conditioning units 34, 36 disposed on a roof of fifth wheel trailer 30. As will become more apparent below, each recreational vehicle conditioning unit 30-36 may be configured to provide cooling and/or other climate control functions within a particular region or zone of a living space. The regions or zones in a living space may, but are not necessarily, based on a partitioning of the living space into separate rooms separated by doors, e.g., whereby one zone is defined in a bedroom and another zone is defined in a kitchen/eating area. In other embodiments, the zones may instead refer to different areas of a single common room in the living space.

Figure 3:
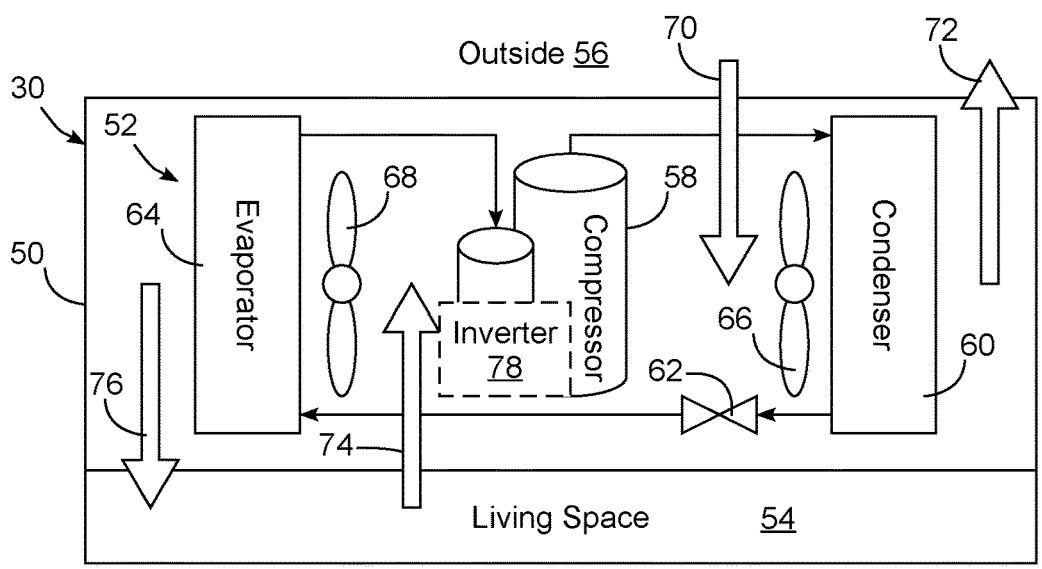
FIG. 3 is a block diagram of a recreation vehicle air conditioning unit with a closed air conditioning circuit capable of being utilized in the recreational vehicles of FIGS. 1 and 2.

Turning to FIG. 3, the primary components associated with providing an air conditioning function in recreational vehicle air conditioning unit 30 are illustrated in greater detail, with an understanding being that in some embodiments, recreational vehicle air conditioning units 32-36 may be similarly configured. Unit 30 in particular includes a housing 50 within which is disposed an air conditioning circuit 52, which operates using a vapor-compression cycle relying on induced phase transitions of a refrigerant between gas and liquid states to transfer heat, in this case from a living space 54 to an outside environment 56.

In air conditioning circuit 52, refrigerant in a state as a low pressure and low temperature vapor is received by compressor 58, which pressurizes the refrigerant into a higher temperature and higher pressure vapor. This high temperature, high pressure vapor then passes through a condenser 60, which functions as a heat exchanger to release heat to its surrounding environment, in this case outside 56. The refrigerant then cools and condenses to a higher pressure liquid, and then passes through an expander 62, e.g., an expansion valve or device, which abruptly causes the temperature to drop, and then through an evaporator 64, which functions as a heat exchanger that vaporizes the refrigerant and absorbs heat from its surrounding environment, in this case living space 54. The refrigerant then returns to compressor 58 as the low pressure and low temperature vapor. Condenser 60 is generally positioned in unit 30 for exposure to outside 56, while evaporator 64 is generally positioned in unit 30 for exposure to living space 54. A condenser fan 66 and/or an evaporator fan 68 may also be used to increase the thermal exchange between condenser 60 and outside 56 (represented by arrows 70, 72) and between evaporator 64 and living space 54 (represented by arrows 74, 76).

Air conditioning circuit 52 in FIG. 3 is referred to herein as a closed air conditioning circuit, as the air conditioning circuit is a closed loop system in which refrigerant is circulated between a compressor, condenser, expander and evaporator within a single housing or unit. As will become more apparent below, in some embodiments an air conditioning circuit may be shared between one or more housings or units, e.g., using refrigerant line sets that transfer refrigerant between different components in different housings or units.

In addition, it will be appreciated that compressor 58 may be a single speed or multi-speed compressor in various embodiments. Furthermore, in some embodiments, an inverter 78 may be used to drive compressor at a variable speed. As it will be appreciated that initial startup of a compressor at full speed is generally the time at which the power draw by an air conditioning unit is at its greatest, varying the speed of the compressor using an inverter can reduce both the maximum power draw at startup and the power draw during normal operation. Any or all of fans 66, 68 may also be variable fans in some embodiments to provide varying flow rates.

Figure 4:
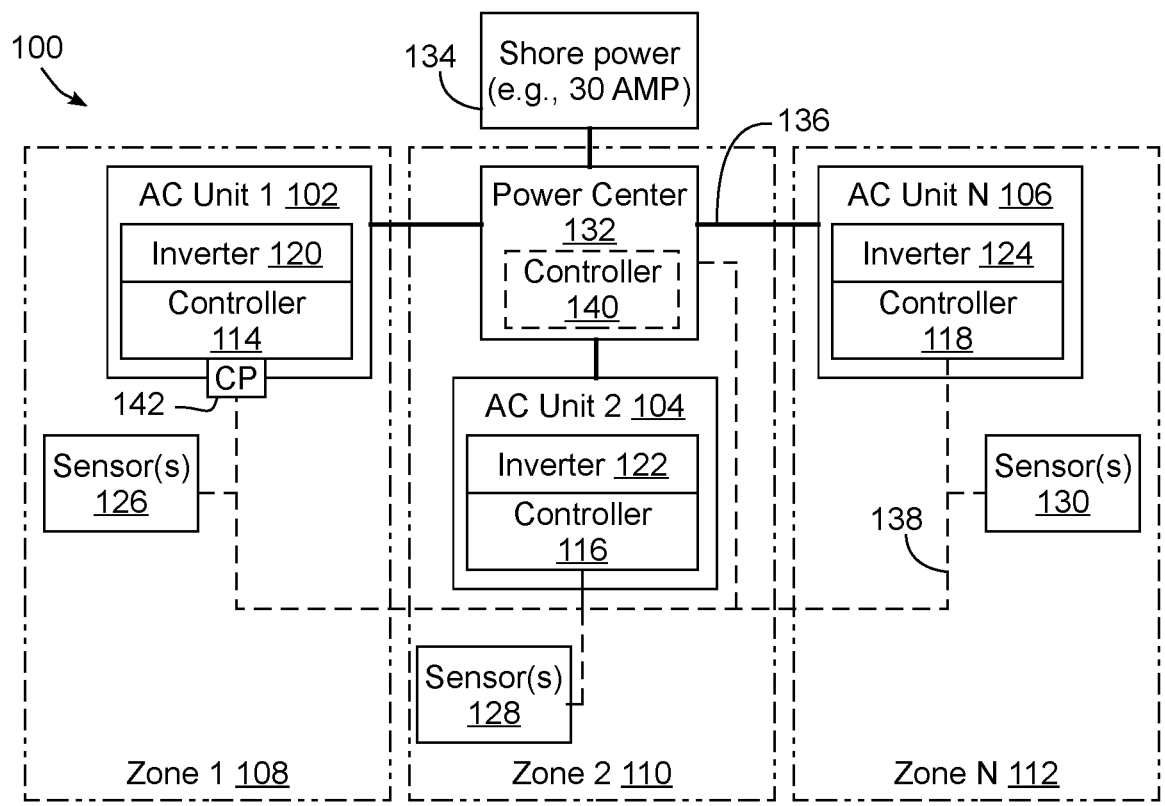
FIG. 4 is a block diagram of an example recreational vehicle air conditioning system capable of being utilized in the recreational vehicles of FIGS. 1 and 2.

Now turning to FIG. 4, in some embodiments of the invention, a recreational vehicle air conditioning system may include multiple recreational vehicle air conditioning (AC) units, each having a closed air conditioning circuit including a compressor for cooling an associated zone in a living space of the recreational vehicle, along with a controller in electrical communication with each of the air conditioning circuits and configured to control operation of each of the air conditioning circuits to regulate an overall power consumption for the air conditioning circuits. While not required, in some embodiments each air conditioning circuit may be inverter driven such that the speed of each compressor, and thus the power consumption of the air conditioning circuit, may be controlled in a variable manner.

In one example and non-limiting embodiment, control may be implemented primarily in a controller of one of the recreational vehicle air conditioning units (designated as a primary AC unit), which may maintain algorithms for load sharing purposes, and which may be connected to one or more additional recreational vehicle air conditioning units (designated as a secondary AC unit, and which in some, but not all, instances may be smaller or with lower capacity) through a wired or wireless communication channel, e.g., a dedicated DC bus or pigtail. In this embodiment, the primary AC unit may be configured to operate at 100% capacity when only one AC unit is utilized (i.e., when the primary AC unit is not coupled to a secondary AC unit), but if a secondary AC unit is installed, the primary AC unit can still function, but may also oversee control of the secondary AC unit, and manage the overall power consumption by both AC units to avoid overcurrent situations. As each AC unit may be configured as a separate AC unit with a closed air conditioning circuit having a separate compressor and inverter, the AC units may still be operated as independent, off the shelf AC units, but when mated together, the AC units may communicate and load share. In some embodiments, such a configuration may eliminate the need for, or in the least eliminate the involvement of, a third party power center, as the two AC units may cooperatively control themselves to moderate power, and avoid overcurrent situations. One advantage of such a configuration, particularly when used in connection with inverter-based control over the compressors, would be greater simplicity and added control over an entire, multi-zone living space without the relatively noisy start/stop/start/stop cycling that is typical of many RV AC units.

FIG. 4, for example, illustrates a recreational vehicle air conditioning system 100 including a plurality (N) of AC units 102, 104, 106 associated with separate zones 108, 110, 112 in a living space of a recreational vehicle, and having an associated controller 114, 116, 118. In addition, one or all of AC units 102, 104, 106 may include an associated inverter 120, 122, 124 enabling variable control of a compressor of the closed air conditioning circuit of the respective AC unit 102, 104, 106. Otherwise, each AC unit 102, 104, 106 may use a single speed or multi-speed compressor in other embodiments. It will be appreciated that, when a compressor is single speed, during high demand periods, management of power consumption may involve temporarily shutting off the compressor (potentially while maintaining the fan for airflow), while when a compressor is multi-speed or variable speed, management of power consumption may involve operating the compressor at a lower speed to reduce power consumption.

In some embodiments, each AC unit 102, 104, 106 may include, in addition to air conditioning or cooling functionality, heat, dehumidification and/or ventilation functionality. While in some embodiments all AC units may have identical capacities and functionalities, in other embodiments the cooling capacities or other functionalities of the AC units may differ from one another.

In addition, within each zone and associated with each AC unit 102, 104, 106 may be one or more sensors 126, 128, 130. Various types of sensors may be used in various embodiments, including temperature sensors and/or thermostats, occupancy sensors, and/or humidity sensors that provide measurements associated with the living space and in particular, the associated zone of the living space. In addition, in some embodiments, current or other sensors capable of measuring the power consumption of an associated AC unit may be used.

Each AC unit 102, 104, 106 may be powered by a power center 132, or alternatively a power board or electrical panel, which, in addition to being potentially coupled to various on-board power sources (e.g., batteries, generators, alternators, solar panels, etc.) may be coupled to shore power 134, e.g., a 30 or 50 Amp service provided by a campground or campsite. AC power lines 136 are used to couple each AC unit 102, 104, 106 to power center 132.

In addition, in the illustrated embodiment, a communication channel 138 is established between controllers 114, 116, 118 of AC units 102, 104, 106 and sensors 126, 128, and 130, and in some instances, with an optional controller 140 of power center 132 (which in some instances may also be separate from power center 132). The communication channel 138 may be wired or wireless, e.g., using one or more wired low power DC communication links. The communication channel 138 may incorporate an architecture enabling all controllers to communicate with one another and with all of sensors 126, while in other embodiments, the communication channel 138 may include other architectures, e.g., where only the controllers are in communication with one another and the sensors in each zone are connected only to the controller of the AC unit for the associated zone. In addition, in some embodiments a controller may be integrated with one or more sensors. Each AC unit, controller and/or sensor, for example, may include a communication port (e.g., communication port 142 illustrated as coupled to controller 114) that may be coupled to the communication channel 138.

Figure 5:
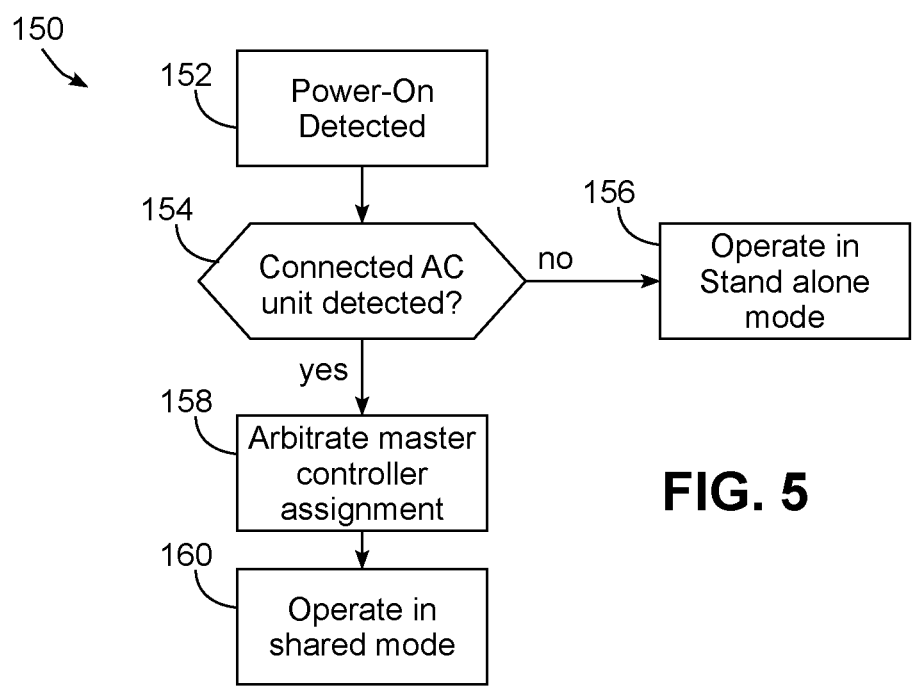
FIG. 5 is a flowchart illustrating an example sequence of operations for starting up one of the recreational vehicle an air conditioning units of FIG. 4.

As noted above, in some embodiments it may be desirable to enable an AC unit to operate in different modes based at least in part on whether that AC unit is coupled to another AC unit, e.g., a stand alone mode where the AC unit operates as a self-contained AC unit to cool a living space of a recreational vehicle, and a shared mode where multiple AC units are controlled together to manage their overall power consumption, and where one of the AC units instructs one or more other AC units to cool different zones of a living space. FIG. 5 illustrates a sequence of operations 150 that may be performed by a controller of an AC unit 102, 104, 106 during startup to automatically detect a mode of operation. Specifically, upon detection of initial power on (block 152), block 154 may determine whether another, connected AC unit has been detected. Such detection may be based on, for example, a signal received over communication channel 138, or based on the configuration of the AC unit (e.g., based on a DIP switch setting set during installation, or based upon settings otherwise established during installation such as made through a user interface of the AC unit, an app of a mobile device, etc.).

If no other AC unit has been detected, control passes to block 156 to operate the AC unit in a stand alone mode. If another AC unit has been detected, however, control passes to block 158 to arbitrate for a master controller assignment, i.e., to determine which controller in the air conditioning system should operate as the master or primary controller. The arbitration, for example, may be based in some embodiments on the configuration of each AC unit (e.g., based on DIP switch settings set during installation), or based upon settings otherwise established during installation (e.g., made through a user interface of the AC unit, an app of a mobile device, etc.). The arbitration may also be based on the characteristics of the different AC units, e.g., to default to a larger, high capacity AC unit when coupled to a smaller, lower capacity AC unit. Then, in block 160, the AC unit operates in a shared mode, either as a primary AC unit (in a primary shared mode) or a secondary AC unit (in a secondary shared mode) as determined in block 158.

Figure 6:
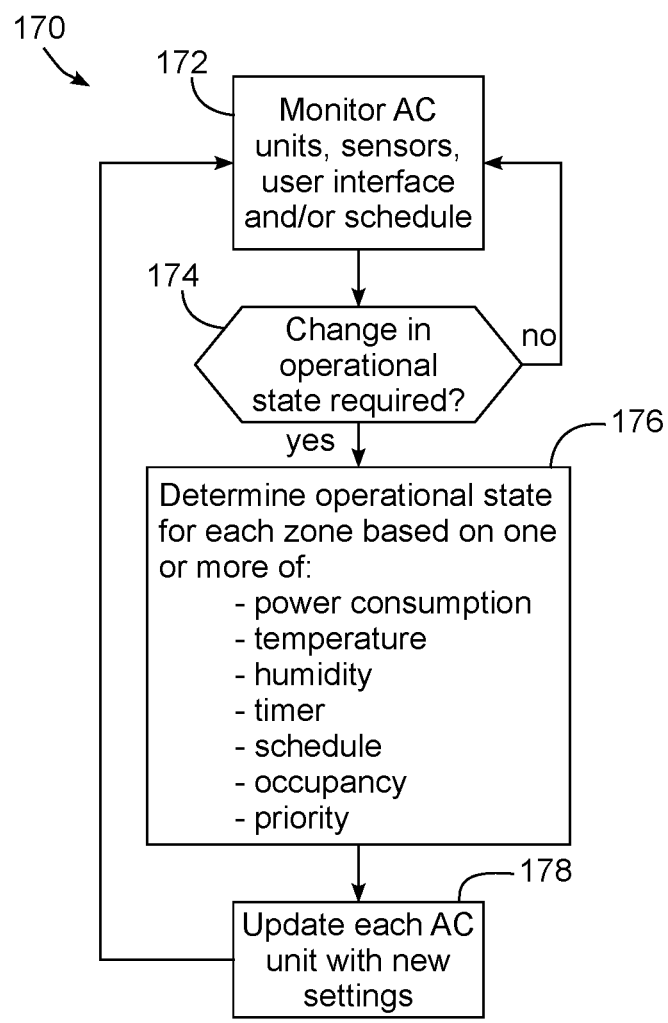
FIG. 6 is a flowchart illustrating an example sequence of operations for operating the recreational vehicle an air conditioning units of FIG. 4 in a shared mode of operation.

Now turning to FIG. 6, an example sequence of operations 170 for operating an air conditioning system such as air conditioning system 100 of FIG. 4 is illustrated in greater detail. Sequence 170 may be executed, for example, by the controller 114, 116, 118 of one of AC units 102, 104, 106 designated as the primary AC unit, or in some embodiments, by a separate controller such as controller 140 that is in communication with the AC units 102, 104, 106.

In sequence 170, the AC units and sensors are monitored, e.g., to determine the current state of each AC unit as well as the current measurements collected by the sensors. In addition, a user interface of the controller and/or of the AC units may be monitored to determine if a user has changed the operation of one of the AC units. Furthermore, where an AC unit supports schedules (e.g., to change the temperature setpoint of an AC unit at different times of the day), the stored schedules for the AC units may also be monitored.

If no change in operational state is required based upon the monitored conditions, block 174 returns control to block 172 to continue monitoring. However, if any of the monitored conditions indicates that a change in operational state is required, block 174 passes control to block 176 to determine an operational state for each AC unit in each zone based upon one or more of power consumption, temperature, humidity, a timer, a schedule, occupancy, or priority. Then, based upon the determined operational states, block 178 updates each AC unit with new settings suitable for establishing the operational states, and control returns to block 172 to continue monitoring.

As one non-limiting example, assume a first, larger capacity AC unit in the kitchen/eating zone of a living space coupled in a shared mode with a smaller, smaller capacity AC unit in the bedroom of the living space, and it is early in the morning while the occupants are sleeping in the bedroom. Assume also that based on occupancy settings, thermostat settings, time of day, etc., the secondary AC unit is operating with a setpoint of 70 degrees, while the primary AC unit is operating at a setpoint of 78 degrees, and that the actual temperature in those zones are currently 72 degrees and 75 degrees, respectively, such that only the secondary AC unit is currently active.

Then, assume that, either due to detection of occupancy in the kitchen/eating zone or a particular time setting being triggered, the temperature setpoint for the primary AC unit is changed to 70 degrees, requiring that the primary AC unit be activated, as might be detected by block 174. Based upon this requirement, suitable operational settings may be determined for both AC units, e.g., to turn on the primary AC unit and either turn off or lower the speed of the compressor on the secondary AC unit. During such an operation, the total current consumption of both AC units may be predicted or determined, e.g., based upon current sensors or based upon stored values associated with different operational states of each AC unit, with the operation of each AC unit adjusted to maintain the overall power consumption of both AC units within a desired power envelope, e.g., with a total current draw that is within the capacity of the power source. Thus, for example, if inverters and variable speed compressors are used, it may be determined in some instances that turning on the primary AC unit to 100% would increase the overall power consumption above a predetermined limit, and cause either the primary AC unit to be turned on at a lower speed, or the speed of the secondary AC unit to be decreased (or both) to keep the overall power consumption below the limit.

It will be appreciated that an innumerable number of different types of load sharing and climate control algorithms may be used in different embodiments to collectively manage the operation of both AC units while maintaining their power consumption within the capacity of the power source, so the invention is not limited to the specific examples given herein.

Updating of each AC unit in block 178 may include, for example, a primary controller executing sequence 170 instructing the controller of a different AC unit over communication channel 138, and if the primary controller is disposed within an AC unit, having the primary controller control its own settings as it would do when operating in a stand alone mode.

Figure 7:
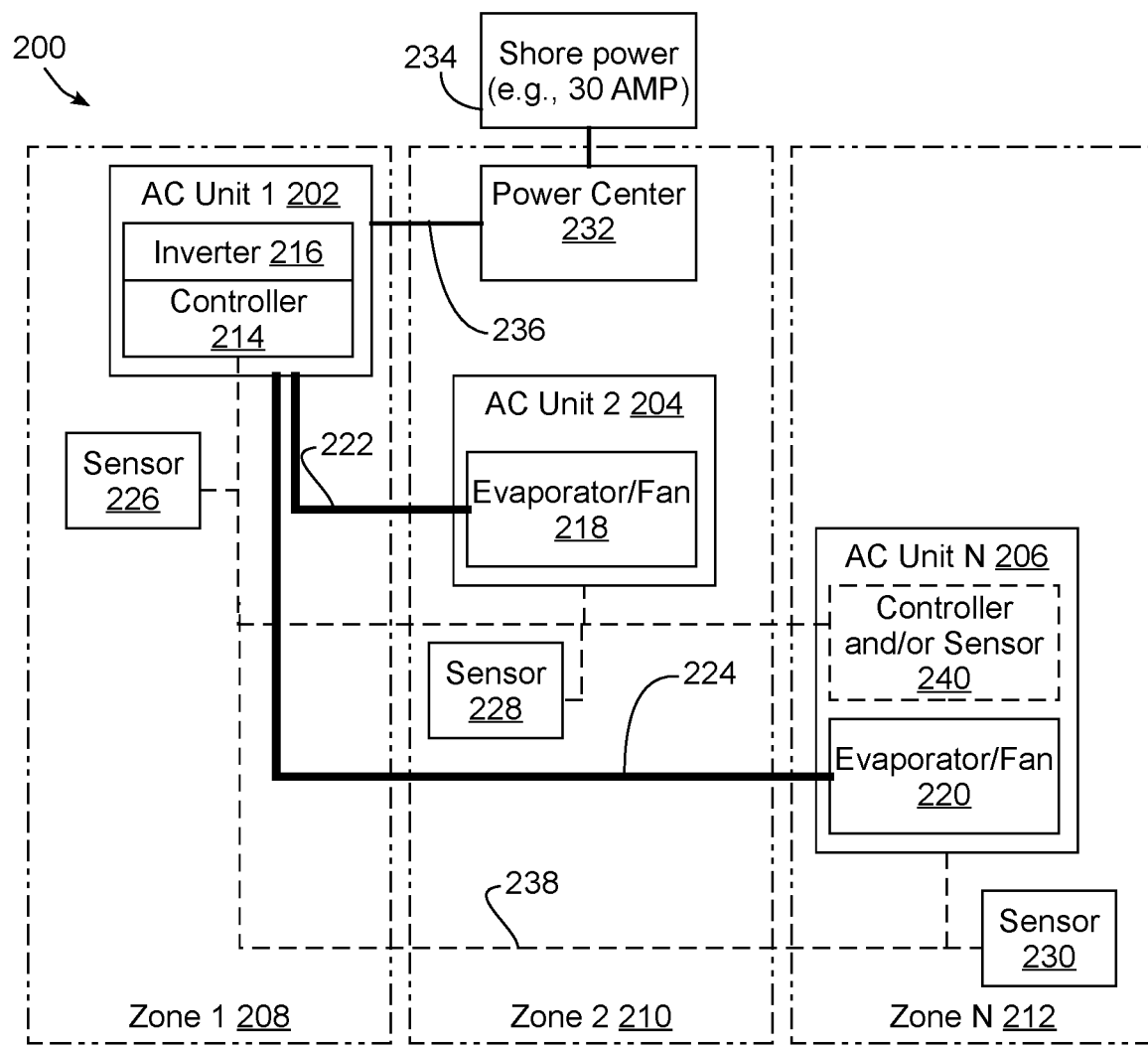
FIG. 7 is a block diagram of another example recreational vehicle air conditioning system capable of being utilized in the recreational vehicles of FIGS. 1 and 2.

FIG. 7 next illustrates another example embodiment of the invention, where rather than having each AC unit be a separate AC unit having a complete closed air conditioning circuit, one or more line sets are routed between the AC units to enable the compressor and condenser of one primary AC unit to drive an evaporator in one or more secondary AC units that are external to the one primary AC unit.

In particular, in some embodiments, a primary AC unit may be configured in some embodiments similar to the AC units described above, with the addition of a refrigerant port and one or more diverter valves that enable the primary AC unit to be coupled to a secondary AC unit through a line set such that the secondary AC unit receives its refrigerant from the primary AC unit, eliminating the need for the secondary AC unit to utilize a separate compressor, condenser, and in some instances, inverter, such that the secondary AC unit predominantly incorporates an expander, evaporator and evaporator fan. It will be appreciated that such a design may have advantages in terms of cost, power consumption, and noise, and as will be discussed in greater detail below, may in some instances allow for different placement of the primary and/or secondary AC units within a recreational vehicle.

In some embodiments consistent with the invention, for example, a first recreational vehicle air conditioning unit may include a first air conditioning circuit including a compressor, a first evaporator, and a first valve configured to regulate refrigerant flow through the first evaporator, a first refrigerant port coupled in parallel with the first evaporator, the first refrigerant port including a first outlet coupled upstream of the first evaporator and a first inlet coupled downstream of the first evaporator, and a second valve configured to regulate refrigerant flow through the refrigerant port. A second recreational vehicle air conditioning unit in turn may include a second air conditioning circuit including a second evaporator and a second refrigerant port including a second inlet coupled upstream of the second evaporator and a second outlet coupled downstream of the second evaporator. A refrigerant line set may couple the first outlet to the second inlet and couple the second outlet to the first inlet to place the second evaporator in fluid communication with the compressor, and a controller coupled to the compressor and the first and second valves may be configured to control the first and second valves while running the compressor to regulate refrigerant flow through each of the first and second evaporators and thereby control cooling of the first and second zones in the living space of the recreational vehicle.

FIG. 7, in particular, illustrates a recreational vehicle air conditioning system 200 including a plurality (N) of AC units 202, 204, 206 associated with separate zones 208, 210, 212 in a living space of a recreational vehicle, with AC unit 202 serving as a primary AC unit additionally including a controller 214, and in some instances, an associated inverter 216 enabling variable control of a compressor of the air conditioning circuit of the primary AC unit 202 (not shown in FIG. 7). Each AC unit 204, 206 functions as a secondary AC unit, and rather than having a complete air conditioning circuit, includes an associated evaporator and fan (blocks 218, 220), with refrigerant line sets 222, 224 respectively coupling the primary AC unit 202 to each of AC units 204, 206.

Within each zone and associated with each AC unit 202, 204, 206 may be one or more sensors 226, 228, 230. Various types of sensors may be used in various embodiments, including temperature sensors and/or thermostats, occupancy sensors, and/or humidity sensors that provide measurements associated with the living space and in particular, the associated zone of the living space. In addition, in some embodiments, current or other sensors capable of measuring the power consumption of an associated AC unit may be used.

Primary AC unit 202 may be powered by a power center 232, or alternatively a power board or electrical panel, which, in addition to being potentially coupled to various on-board power sources (e.g., batteries, generators, alternators, solar panels, etc.) may be coupled to shore power 234, e.g., a 30 or 50 Amp service provided by a campground or campsite. AC power lines 236 are used to couple AC unit 202 to power center 232.

In addition, in the illustrated embodiment, a communication channel 238 is established between controller 214 each of sensors 226, 228, and 230. In addition, as represented by block 240, in some embodiments a secondary AC unit such as AC unit 206 may include an integrated controller and/or one or more sensors, which may also be coupled to communication channel 238. As represented by AC unit 204, however, some secondary AC units may lack controllers and/or associated sensors in some embodiments. The communication channel 238 may be wired or wireless, e.g., using one or more wired low power DC communication links, and each endpoint coupled to the communication channel 238 may include an associated communication port (not shown in FIG. 7). Moreover, while in some embodiments each secondary AC unit 204, 206 may be coupled to power center 232 to receive power to drive various components in the AC unit, in other embodiments, given that each secondary AC unit 204, 206 omits a compressor and generally includes a single fan, power to each secondary AC unit may be supplied by primary AC unit 202, e.g., using one or more power and/or communication lines incorporated into a line set 222, 224.

Figure 8:
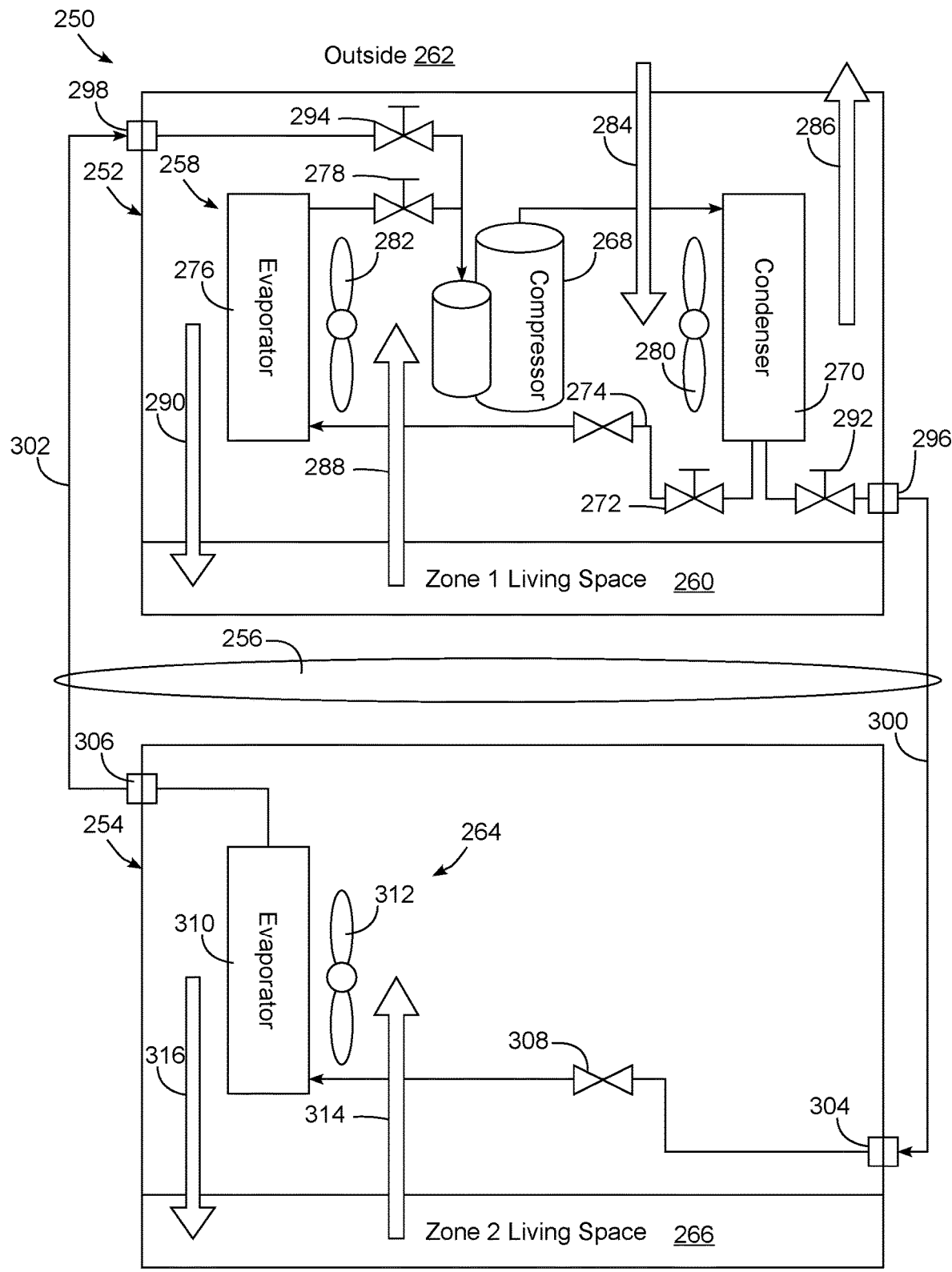
FIG. 8 is a block diagram of a shared air conditioning circuit capable of being utilized in the recreational vehicles of FIGS. 1 and 2.

Turning to FIG. 8, the primary components associated with providing an air conditioning function in a recreational vehicle air conditioning system 250 incorporating primary and secondary AC units 252, 254 coupled together by a line set 256 are illustrated in greater detail. Primary AC unit 252 in particular includes a first air conditioning circuit 258, which operates using a vapor-compression cycle relying on induced phase transitions of a refrigerant between gas and liquid states to transfer heat, in this case from a first zone 260 of a living space to an outside environment 262, while secondary AC unit 254 includes a second air conditioning circuit 264 that, as will become more apparent below, is an extension of first air conditioning circuit 258, and that transfers heat from a second zone 266 of living space.

In air conditioning circuit 258, refrigerant in a state as a low pressure and low temperature vapor is received by compressor 268, which pressurizes the refrigerant into a higher temperature and higher pressure vapor. This high temperature, high pressure vapor then passes through a condenser 270, which functions as a heat exchanger to release heat to its surrounding environment, in this case outside 262. The refrigerant then cools and condenses to a higher pressure liquid, and then passes through a primary supply solenoid valve 272 and an expander 264, e.g., an expansion valve or device, which abruptly causes the temperature to drop, and then through an evaporator 276, which functions as a heat exchanger that vaporizes the refrigerant and absorbs heat from its surrounding environment, in this case living space zone 260. The refrigerant then returns to compressor 268 through a primary return solenoid valve 278 as the low pressure and low temperature vapor. Condenser 270 is generally positioned in unit 252 for exposure to outside 262, while evaporator 276 is generally positioned in unit 252 for exposure to living space zone 260. A condenser fan 280 and/or an evaporator fan 282 may also be used to increase the thermal exchange between condenser 270 and outside 262 (represented by arrows 284, 286) and between evaporator 276 and living space zone 260 (represented by arrows 288, 290).

In addition, AC unit 252 includes a pair of secondary supply and return solenoid valves 292, 294 that are coupled in parallel to primary supply and return solenoid valves 272, 278, respectively, and that respectively couple condenser 270 to a refrigerant outlet 296 and an upstream (lower pressure) side of compressor 268 refrigerant inlet 298 that together represent a refrigerant port for AC unit 252, such that the refrigerant port is effectively in parallel with evaporator 276, with refrigerant outlet 296 upstream of evaporator 276 and refrigerant inlet 298 downstream of evaporator 276.

Line set 256 includes first and second refrigerant lines 300, 302 that respectively couple refrigerant outlet 296 to a refrigerant inlet 304 of AC unit 254 and couple a refrigerant outlet 306 of AC unit 254 to refrigerant inlet 298, such that refrigerant inlet 304 and refrigerant outlet 306 may be considered to represent a refrigerant port for AC unit 254.

Air conditioning circuit 264 of secondary AC unit 254 includes an expander 308, e.g., an expansion valve or device, which is coupled to refrigerant inlet 304 and feeds a second evaporator 310, which in turn is coupled to refrigerant outlet 306, such that when line set 256 couples AC units 252 and 254 to one another, evaporator 310 is effectively in parallel with evaporator 276 (in other embodiments, expander 308 may be disposed in AC unit 252). As such, by controlling valves 272, 278, 292 and 294 during operation of compressor 268, primary AC unit 252 is able to control cooling in each of living space zones 260, 266 through regulation of the refrigerant flow through each evaporator 276, 310. Secondary AC unit 254 may also include an associated evaporator fan 312, which may be variable speed in some embodiments, and controlled either by AC unit 252 or AC unit 254, thereby increasing thermal exchange between evaporator 310 and living space zone 266 (represented by arrows 314, 316).

Valves 272, 278, 292 and 294 may be variable valves in some embodiments or may be on/off valves in other, and in some embodiments one or more of the valves may be omitted (e.g., where it is desirable to always operate evaporator 276 or evaporator 310 when compressor 268 is active, or where refrigerant flow through one of evaporators 276, 310 may be adequately controlled without having separate valves both upstream and downstream of an evaporator.

Figure 9:
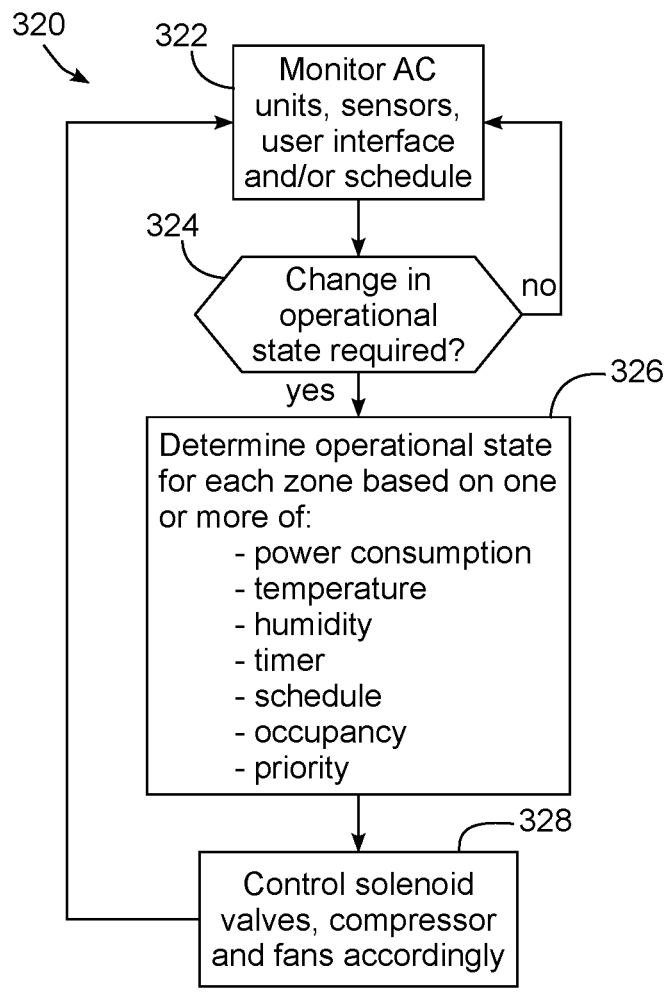
FIG. 9 is a flowchart illustrating an example sequence of operations for operating the recreational vehicle an air conditioning units of FIG. 7 in a shared mode of operation.

Now turning to FIG. 9, an example sequence of operations 320 for operating an air conditioning system such as air conditioning system 200 of FIG. 7 is illustrated in greater detail. Sequence 320 may be executed, for example, by the controller 214 of AC unit 202, or in some embodiments, by a separate controller that is in communication with AC unit 202.

In sequence 320, the AC units and sensors are monitored, e.g., to determine the current state of each AC unit as well as the current measurements collected by the sensors. In addition, a user interface of the controller and/or of the AC units may be monitored to determine if a user has changed the operation of one of the AC units. Furthermore, where an AC unit supports schedules (e.g., to change the temperature setpoint of an AC unit at different times of the day), the stored schedules for the AC units may also be monitored.

If no change in operational state is required based upon the monitored conditions, block 324 returns control to block 322 to continue monitoring. However, if any of the monitored conditions indicates that a change in operational state is required, block 324 passes control to block 326 to determine an operational state for each AC unit in each zone based upon one or more of power consumption, temperature, humidity, a timer, a schedule, occupancy, or priority, in a similar manner to that described above in connection with sequence 170. Then, based upon the determined operational states, block 328 controls the solenoid valves, compressor and fans of each AC unit based upon the determined operational state for each zone, and control returns to block 322 to continue monitoring.

Figure 10:
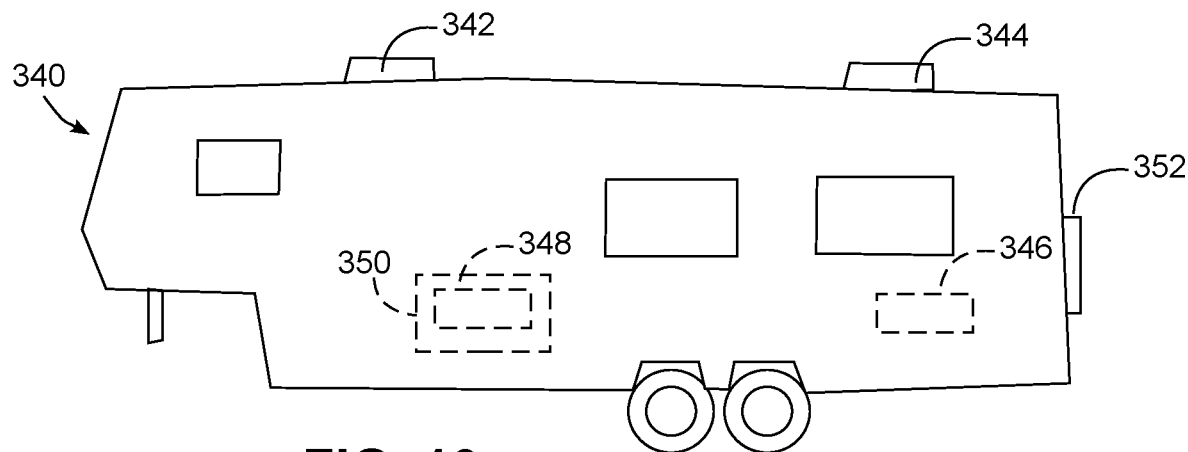
FIG. 10 is a side elevational view of yet another recreational vehicle consistent with some embodiments of the invention.

As noted above, due to the lack of compressor in a secondary AC unit in the embodiments of FIGS. 7-9, different form factors and installation locations for secondary AC units may be used in other embodiments. For example, as illustrated by recreational vehicle 340 of FIG. 10, while a primary AC unit 342 may be configured as a rooftop AC unit, a secondary AC unit may be configured as a rooftop AC unit 344 in some embodiments, while in other embodiments, a secondary AC unit may be mounted on a side wall of the recreational vehicle, e.g., as illustrated by secondary AC unit 346, or may be mounted in a cabinet, e.g., as illustrated by secondary AC unit 348 mounted in cabinet 350. In addition, a drain connection may also be supported within a cabinet for a secondary AC unit to capture condensation, potentially avoiding the need for additional holes in the exterior body of the recreational vehicle. Due to the lack of a large and/or noisy compressor in each secondary AC unit, each secondary AC unit is thus capable of being constructed in a more compact housing and in a form factor that is better suited for unobtrusive integration into the living space.

Furthermore, in some embodiments, it may be desirable to mount a primary AC unit to an outer wall, e.g., a rear wall, of a recreational vehicle, e.g., as illustrated by primary AC unit 352, or in other locations, such as underneath the vehicle or within a compartment within the vehicle but separate from the living space. In addition, in some embodiments a primary AC unit may lack its own evaporator, such that all evaporators are disposed in secondary AC units and provided with refrigerant from a single compressor in a primary AC unit.

The aforementioned embodiments provide a number advantages. For example, in some instances, a recreational vehicle may be able to omit support for 50 Amp service in some instances, lowering manufacturing costs. Alternatively, a larger recreational vehicle may, instead of having two high powered AC units, rely on three, four or more smaller AC units configured in the manner disclosed herein, providing more granular climate control within the living space.

Further, it will be appreciated that various modifications may be made to the aforementioned embodiments. For example, particularly when inverters are used, it may be desirable to implement a whole RV dehumidification cycle that could be configured to run between normal cycles or at night. Further, the aforementioned air conditioning circuits may also be configured as heat pumps in some embodiments, thereby enabling heating to be performed, and without requiring the use of separate heating elements or gas heaters. Further, ventilation functionality may be supported, e.g., to support the use of a make up vent that, based on air temperature, humidity, or even smoke in the living space during cooking, either provided or restricted inlet air as needed using one or more of the AC units.

It will be appreciated that various additional modifications may be made to the embodiments discussed herein, and that a number of the concepts disclosed herein may be used in combination with one another or may be used separately. Other modifications will be apparent to those of ordinary skill in the art having the benefit of the instant disclosure. Therefore, the invention lies in the claims hereinafter appended.

What is claimed is:

1. An air conditioning system for a recreational vehicle, the system comprising:
a power center configured to be coupled to an alternating current (AC) shore power at a campsite, wherein the AC shore power has a predetermined maximum amperage;
a first recreational vehicle air conditioning unit coupled to receive power from the power center, the first recreational vehicle air conditioning unit including a first closed air conditioning circuit including a first compressor for cooling a first zone in a living space of the recreational vehicle;
a second recreational vehicle air conditioning unit coupled to receive power from the power center, the second recreational vehicle air conditioning unit including a second closed air conditioning circuit including a second compressor for cooling a second zone in the living space of the recreational vehicle; and
a controller in electrical communication with each of the first and second closed air conditioning circuits and configured to control operation of each of the first and second air conditioning circuits to regulate an overall power consumption for the first and second closed air conditioning circuits to maintain an overall current draw for the first and second closed air condition circuits within the predetermined maximum amperage of the AC shore power.

2. The air conditioning system of claim 1, wherein the controller is external to both of the first and second recreational vehicle air conditioning units.

3. The air conditioning system of claim 1, wherein the controller is disposed in the first recreational vehicle air conditioning unit.

4. The air conditioning system of claim 3, wherein the controller is a first controller and wherein the second recreational vehicle air conditioning unit includes a second controller disposed in the second recreational vehicle air conditioning unit and in communication with the first controller.

5. The air conditioning system of claim 4, further comprising a communication channel established between the first and second controllers, wherein the first controller is configured to control operation of the second air conditioning circuit by instructing the second controller over the communication channel.

6. The air conditioning system of claim 5, wherein the communication channel comprises a wired low power communication link extending between the first and second recreational vehicle air conditioning units.

7. The air conditioning system of claim 5, wherein the first controller is configured to operate in a shared mode in response to detection of the second recreational vehicle air conditioning unit over the communication channel, and to otherwise operate in a stand alone mode.

8. The air conditioning system of claim 1, further comprising first and second sensors disposed in each of the first and second zones, wherein the controller is configured to receive measurements from the first and second sensors and to control operation of each of the first and second air conditioning circuits based at least in part on the measurements from the first and second sensors.

9. The air conditioning system of claim 8, wherein each of the first and second sensors is a temperature sensor, an occupancy sensor, a current sensor, or a humidity sensor.

10. The air conditioning system of claim 1, wherein the first air conditioning circuit further includes an inverter configured to regulate a speed of the first compressor, and wherein the controller is configured to control operation of each of the first and second air conditioning circuits at least in part by controlling the inverter to regulate the speed of the first compressor.

11. The air conditioning system of claim 1, wherein the first air conditioning circuit further includes a first fan for blowing cooled air into the first zone and the second air conditioning circuit further includes a second fan for blowing cooled air into the second zone, wherein the controller is further configured to control operation of each of the first and second air conditioning circuits at least in part by controlling the first and second fans.

12. An air conditioning system for a recreational vehicle, the system comprising:
- a first recreational vehicle air conditioning unit, the first recreational vehicle air conditioning unit including a first closed air conditioning circuit including a first compressor for cooling a first zone in a living space of the recreational vehicle;
- a second recreational vehicle air conditioning unit, the second recreational vehicle air conditioning unit including a second closed air conditioning circuit including a second compressor for cooling a second zone in the living space of the recreational vehicle; and
- a controller in electrical communication with each of the first and second closed air conditioning circuits and configured to control operation of each of the first and second air conditioning circuits to regulate an overall power consumption for the first and second closed air conditioning circuits;
- wherein the controller is disposed in the first recreational vehicle air conditioning unit;
- wherein the controller is a first controller and wherein the second recreational vehicle air conditioning unit includes a second controller disposed in the second recreational vehicle air conditioning unit and in communication with the first controller;
- wherein the first controller is configured to operate in one of a shared mode and a stand alone mode;
- wherein the air conditioning system further comprises a communication channel established between the first and second controllers, wherein the first controller is configured to control operation of the second air conditioning circuit when in the shared mode by instructing the second controller over the communication channel;
- wherein the first controller is configured to control operation of the first air conditioning circuit when in the stand alone mode; and
- wherein the first controller is configured to automatically select one of the shared mode and the stand alone mode upon initial power on, and in response to automatic selection of the shared mode, arbitrate for a master controller assignment.

13. The air conditioning system of claim 12, wherein the second controller is configured to operate in one of a shared mode and a stand alone mode, and wherein the second controller is configured to automatically select one of the shared mode and the stand alone mode upon initial power on, and in response to automatic selection of the shared mode, arbitrate for a master controller assignment.

14. The air conditioning system of claim 13, wherein arbitration for the master controller assignment by the first and second controllers causes the first recreational vehicle air conditioning unit to be configured as a primary recreational vehicle air conditioning unit and the second recreational vehicle air conditioning unit to be configured as a secondary recreational vehicle air conditioning unit such that the first controller controls operation of each of the first and second air conditioning circuits to regulate the overall power consumption for the first and second closed air conditioning circuits.

15. The air conditioning system of claim 12, wherein the first controller is configured to automatically select the one of the shared mode and the stand alone mode in response to detection of the second controller over the communication channel.

16. The air conditioning system of claim 12, wherein the first controller is configured to automatically select the one of the shared mode and the stand alone mode in response to a DIP switch setting.

17. The air conditioning system of claim 12, wherein the first controller is configured to automatically select the one of the shared mode and the stand alone mode in response to a setting established during installation made through a user interface of the first recreational vehicle air conditioning unit or an application of a mobile device.

18. The air conditioning system of claim 12, wherein the first controller is configured to arbitrate for the master controller assignment based upon the first recreational vehicle air conditioning unit having a higher capacity than the second recreational vehicle air conditioning unit.

19. The air conditioning system of claim 12, wherein the first controller is configured to arbitrate for the master controller assignment based upon a DIP switch setting.

20. The air conditioning system of claim 12, wherein the first controller is configured to arbitrate for the master controller assignment based upon a setting established during installation made through a user interface of the first recreational vehicle air conditioning unit or an application of a mobile device.

* * * * *